(No Model.) 2 Sheets—Sheet 1.

P. GRANT.
ARMATURE FOR ELECTRIC MOTORS AND GENERATORS.

No. 451,242. Patented Apr. 28, 1891.

WITNESSES:
Otto H. Ehlers
J. P. Davis

INVENTOR:
Perrin Grant,

BY Chas B. Mann
ATTORNEY.

THE NORRIS PETERS CO., PHOTO-LITHO., WASHINGTON, D. C.

(No Model.) 2 Sheets—Sheet 2.
P. GRANT.
ARMATURE FOR ELECTRIC MOTORS AND GENERATORS.
No. 451,242. Patented Apr. 28, 1891.
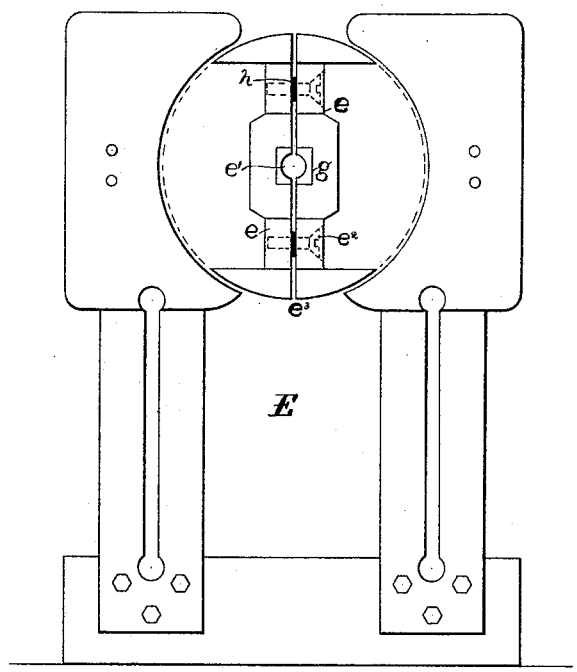
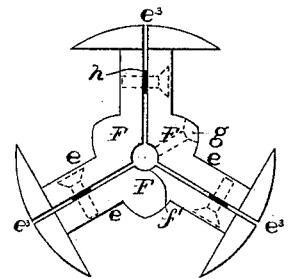
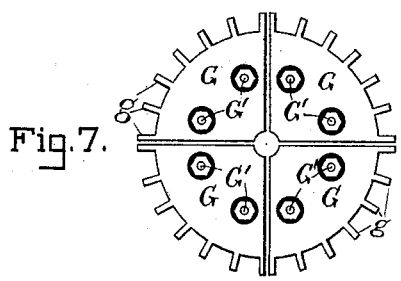
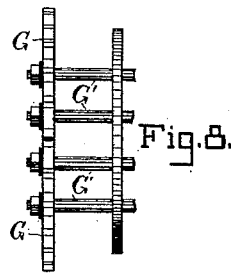
WITNESSES:
Otto H. Ehlers
F. P. Davis.
INVENTOR:
Perrin Grant,
BY Chas B. Mann
ATTORNEY.

UNITED STATES PATENT OFFICE.

PERRIN GRANT, OF BALTIMORE, MARYLAND.

ARMATURE FOR ELECTRIC MOTORS AND GENERATORS.

SPECIFICATION forming part of Letters Patent No. 451,242, dated April 28, 1891.

Application filed November 28, 1890. Serial No. 372,820. (No model.)

*To all whom it may concern:*

Be it known that I, PERRIN GRANT, a citizen of the United States, residing at Baltimore, in the State of Maryland, have invented certain new and useful Improvements in Armatures for Electric Motors, of which the following is a specification.

My invention relates to an improvement in the construction of armatures for electric motors and dynamos; and the main objects sought to be accomplished are to simplify and cheapen the construction, to cause the armature to become more rapidly magnetized and demagnetized, and to obviate heating of the same.

With these ends in view my invention may be said to consist in the peculiar features of construction and combination of parts, more fully described hereinafter, and pointed out in the claims.

Figure 1:
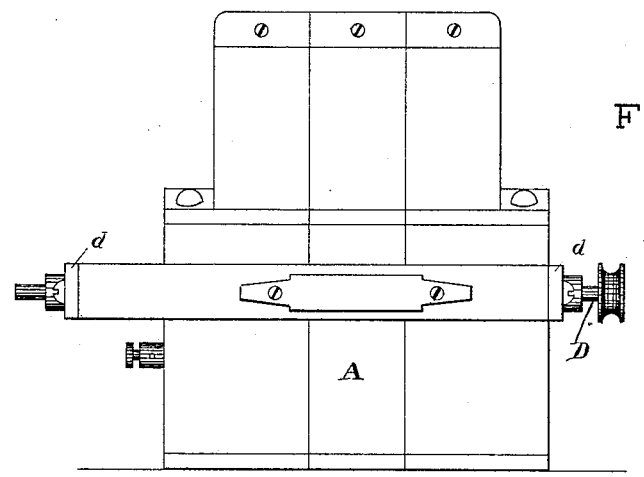
Figure 3:
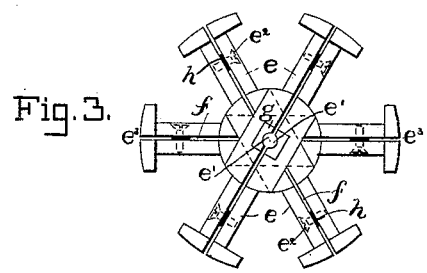
Figure 2:
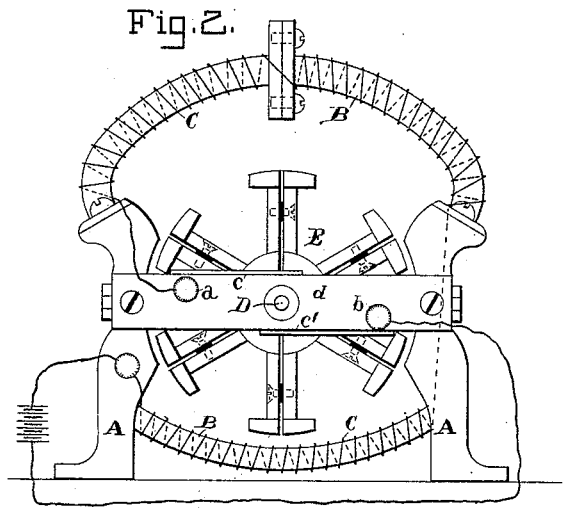
Figure 4:
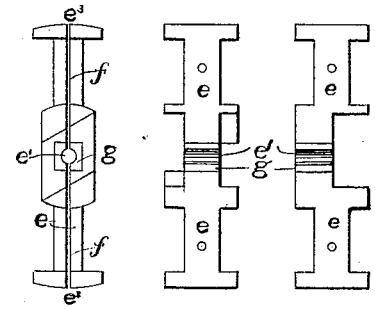

Referring to the accompanying drawings, Figure 1 represents a side elevation of an electric motor constructed after my improved method; Fig. 2, an end view of the same; Fig. 3, a detached view of the armature; Fig. 4, a detail view of an arm of the latter; Fig. 5, an end view of a dynamo provided with my improved armature, and Figs. 6, 7, and 8 modifications of the form of the latter.

In the drawings, A indicates the main frame-work of the motor; B, the cores of the magnets, which may be cast with said frame-work or not, and each made in one piece or in sections, as desired; C, the wire of the magnets, the terminals of which are connected, respectively, to the binding-post $a$ and pillar $b$, and $c$ $c'$ the commutator-brushes, which have electrical connection with the post $a$ and pillar $b$, respectively. Cross-pieces $d$, preferably of brass, extend across the ends of the frame, being secured thereto, and they constitute bearings and supports for the drive-shaft D, on which the armature-core E is mounted. The latter is not made solid, but is a compound core consisting of a number of interlocking radial arms—six in the present instance—each formed of a pair of sections $e$, so secured together as to leave an air-space $f$ between them, and cast with semicircular grooves or offsets $e'$ at their centers, which coincide to form an aperture to accommodate the shaft D. A bushing of brass $g$ is set in the sections $e$ at this point, and the aperture is of such form as to prevent the turning of the shaft independent of the armature. The sections are secured together by small brass screws $e^2$, extending through those portions of them which form the cores of the armature, and washers $h$ of suitable non-conducting material are fitted on the screws between said sections and constitute insulators, besides holding the latter apart to leave the spaces $f$ clear for the circulation of air, for the purpose of keeping the metal of the armature cool. The enlarged heads $e^3$ of the radial arms form the poles of the armature, which are thus six in number; but it is evident that this number may be increased or diminished, according to the size of the motor.

In Fig. 5 a dynamo E is shown provided with an armature consisting of but a pair of sections forming two poles, but in other respects constructed in like manner to that shown in the other figures, and in Fig. 6 a three-arm armature is shown composed of three sections F of angular form, each cast with a notch or offset $f'$ at the center, together forming an aperture for the reception of the shaft, which will be inclosed by a suitable insulating-sleeve, and these sections will be secured together by brass screws in the same manner as those of the six-arm armature. An armature of this type will be keyed to the shaft by a set-screw, such as $g$.

In Figs. 7 and 8 I have represented another modified form, in which the armature is made up of four separate quadrants G, having air-spaces between them, and these quadrants together form a disk armature, which has projecting from its side edges a series of pins or posts $g'$, between which the wire is passed. Said quadrants are notched at the center to accommodate the shaft D and insulating-sleeve around it, as explained in the description of the other figures, and a series of these disks will be held together by bolts $G'$, two extending through each section G parallel with the shaft.

The spaces between the sections of the armature allow free circulation of air, which acts to keep the metal cool and admit of a more rapid magnetization.

Having thus described my invention, what I claim as new, and desire to secure by Letters Patent, is—

1. A compound armature-core formed of a number of sections fitting around the shaft and having air-spaces between their adjacent edges, as set forth.

2. A compound armature-core formed of a number of radial arms, each consisting of a pair of sections connected together with an air-space between them, and constituting one core and pole of the armature, substantially as described.

3. A compound armature-core formed of a number of interlocking radial arms, each consisting of a pair of sections with an air-space between them, and provided with a passage for the shaft.

4. A compound armature-core formed of a number of radial arms, each consisting of a pair of sections connected together with an air-space between them and separated by insulation, two or more of said arms being made with coinciding grooves, forming an aperture for the reception of the shaft.

In testimony whereof I affix my signature in the presence of two witnesses.

PERRIN GRANT.

Witnesses:
F. P. DAVIS,
JNO. T. MADDOX.